(12) United States Patent
Warier et al.

(10) Patent No.: US 8,255,265 B2
(45) Date of Patent: Aug. 28, 2012

(54) SYSTEM AND METHOD OF MODEL FORECASTING BASED ON SUPPLY AND DEMAND

(75) Inventors: Prashant Warier, Scottsdale, AZ (US); David Ginsberg, Scottsdale, AZ (US); Neil Primozich, Phoenix, AZ (US)

(73) Assignee: SAP AG, Walldorf (DE)

( * ) Notice: Subject to any disclaimer, the term of this patent is extended or adjusted under 35 U.S.C. 154(b) by 416 days.

(21) Appl. No.: 12/565,447

(22) Filed: Sep. 23, 2009

(65) Prior Publication Data

US 2011/0071883 A1   Mar. 24, 2011

(51) Int. Cl.
*G06Q 10/00* (2006.01)
(52) U.S. Cl. ...................................................... 705/7.31
(58) Field of Classification Search .................. 705/7.31
See application file for complete search history.

(56) References Cited

U.S. PATENT DOCUMENTS

| | | | |
|---|---|---|---|
| 2004/0236639 A1* | 11/2004 | Candadai et al. ................. | 705/27 |
| 2008/0294481 A1* | 11/2008 | Pierce et al. ....................... | 705/7 |
| 2009/0099879 A1* | 4/2009 | Ouimet .............................. | 705/7 |

OTHER PUBLICATIONS

Sentient Networks and Atlas Services Announce Breakthrough Supplier Partnership. PR Newswire. May 14, 1998.*
Trommer, Diane. Supply Chain Software Grows Up—Slightly bruised but definitely wiser, supply chain executives have learned some valuable lessons in picking the right software. Sep. 2, 2002.*
Messmer, Ellen. Start-up hosting supply-chain apps. Network World. v17n22 pp. 37, 40. May 29, 2000.*

* cited by examiner

*Primary Examiner* — Johnna Loftis
(74) *Attorney, Agent, or Firm* — Buckley, Maschoff & Talwalkar LLC

(57) ABSTRACT

A computer-implemented method transforms transactional data and supply data into a forecast of demand for controlling a commerce system. Goods move between members of a commerce system. Transactional data related to movement of goods between the members of the commerce system is recorded. The transactional data includes customer store, product, time, price, promotion, and merchandizing. Supply data related to movement of goods between the members of the commerce system is recorded. The supply data includes inventory, product, store, and merchandising readily available for purchase. Model parameters are estimated based on the transactional data and supply data using a model to generate a forecast of demand for the goods. The forecast of demand for the goods is provided to a member of the commerce system to control the movement of goods in the commerce system. The forecasts of demand takes into account an out-of-stock condition, price promotion, and promotional lift of the product.

21 Claims, 3 Drawing Sheets

SYSTEM AND METHOD OF MODEL FORECASTING BASED ON SUPPLY AND DEMAND

FIELD OF THE INVENTION

The present invention relates in general to economic modeling and, more particularly, to a system and method for generating a model forecast based on supply and demand.

BACKGROUND OF THE INVENTION

Economic and financial modeling and planning is commonly used to estimate or predict the performance and outcome of real systems, given specific sets of input data of interest. An economic-based system will have many variables and influences which determine its behavior. A model is a mathematical expression or representation which predicts the outcome or behavior of the system under a variety of conditions. In one sense, it is relatively easy to review historical data, understand its past performance, and state with relative certainty that the system's past behavior was indeed driven by the historical data. A much more difficult task is to generate a mathematical model of the system which predicts how the system will behave with different sets of data and assumptions.

In its basic form, the economic model can be viewed as a predicted or anticipated outcome of a mathematical expression, as driven by a given set of input data and assumptions. The input data is processed through the mathematical expression representing either the expected or current behavior of the real system. The mathematical expression is formulated or derived from principles of probability and statistics, often by analyzing historical data and corresponding known outcomes, to achieve a best fit of the expected behavior of the system to other sets of data. In other words, the model should be able to predict the outcome or response of the system to a specific set of data being considered or proposed, within a level of confidence, or an acceptable level of uncertainty.

Economic modeling has many uses and applications. One area in which modeling has been applied is in the retail environment. Grocery stores, general merchandise stores, specialty shops, and other retail outlets face stiff competition for limited customers and business. Most, if not all, retail stores expend great effort to maximize sales, volume, revenue, and/or profit. Economic modeling can be a very effective tool in helping store owners and managers achieve these goals.

One issue with conventional demand modeling involves analysis of out-of-stock conditions. Most, if not all, demand models cannot distinguish between out-of-stock and the product just not selling. When retailers offer promotions on products, the product frequently goes out-of-stock because of increase in sales associated with the reduced price, which is not reflected in the demand model.

SUMMARY OF THE INVENTION

A need exists to model demand behavior that takes into account both supply and demand. Accordingly, in one embodiment, the present invention is a computer-implemented method for transforming transactional data and supply data into a forecast of demand for controlling a commerce system comprising the steps of moving goods between members of a commerce system, and recording transactional data related to movement of goods between the members of the commerce system. The transactional data includes customer, store, product, time, price, promotion, and merchandizing. The method further includes the step of recording supply data related to movement of goods between the members of the commerce system. The supply data includes inventory, product, store, and merchandising. The method further includes the steps of estimating model parameters based on the transactional data and supply data using a model to generate a forecast of demand for the goods, and providing the forecast of demand for the goods to a member of the commerce system to control the movement of goods in the commerce system.

In another embodiment, the present invention is a computer-implemented method for controlling commercial transactions using a forecast of demand based on transactional data and supply data comprising the steps of moving goods between members of a commerce system, recording transactional data related to movement of goods between the members of the commerce system, recording supply data related to movement of goods between the members of the commerce system, estimating model parameters based on the transactional data and supply data using a model to generate a forecast of demand for the goods, and providing the forecast of demand for the goods to a member of the commerce system to control the movement of goods in the commerce system.

In another embodiment, the present invention is a computer program product comprising computer readable program code embodied in a computer usable medium. The computer readable program code is adapted to implement a method for controlling commercial transactions using a forecast of demand based on transactional data and supply data comprising the steps of moving goods between members of a commerce system, recording transactional data related to movement of goods between the members of the commerce system, recording supply data related to movement of goods between the members of the commerce system, estimating model parameters based on the transactional data and supply data using a model to generate a forecast of demand for the goods, and providing the forecast of demand for the goods to a member of the commerce system to control the movement of goods in the commerce system.

In another embodiment, the present invention is a system for controlling commercial transactions using a forecast of demand based on transactional data and supply data comprising a commerce system having a plurality of members each having a control system for controlling movement of goods between the members. A database is in electronic communication with the commerce system for recording transactional data and supply data related to movement of goods between the members of the commerce system. A computer is in electronic communication with the commerce system for estimating model parameters based on the transactional data and supply data using a model to generate a forecast of demand for the goods. The forecast of demand for the goods is provided to a member of the commerce system to control the movement of goods in the commerce system.

DETAILED DESCRIPTION OF THE DRAWINGS

Figure 1:
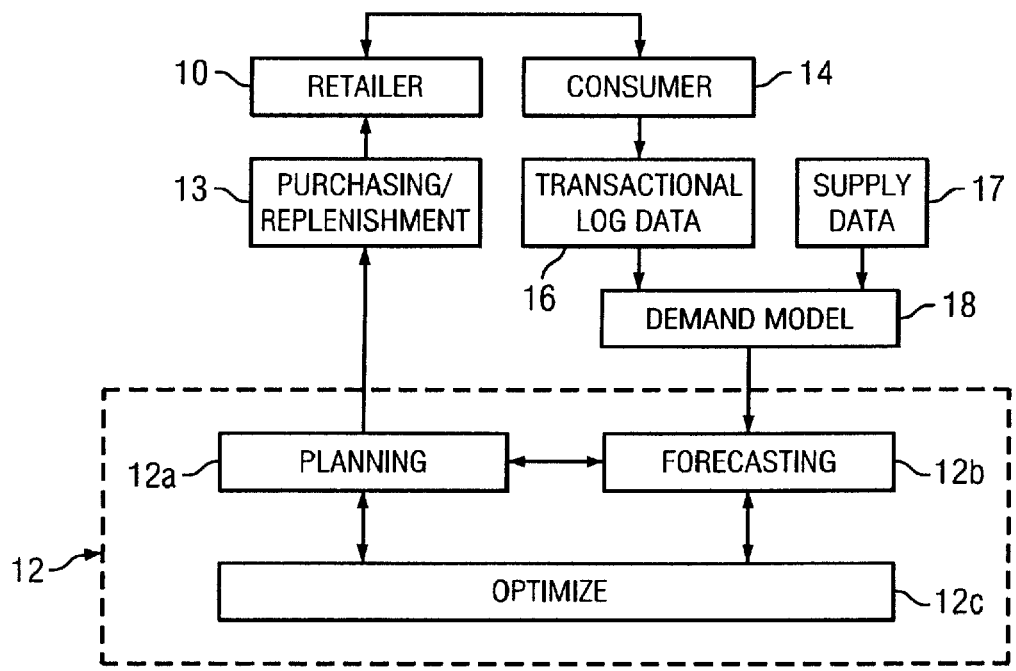
FIG. 1 is a block diagram of a system for analyzing transaction log data and supply data to generate a demand model.

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Economic and financial modeling and planning is an important business tool that allows companies to conduct business planning, forecast demand, and optimize prices and promotions to meet profit and/or revenue goals. Economic modeling is applicable to many businesses, such as manufacturing, distribution, wholesale, retail, medicine, chemicals, financial markets, investing, exchange rates, inflation rates, pricing of options, value of risk, research and development, and the like. In the face of mounting competition and high expectations from investors, most, if not all, businesses must look for every advantage they can muster in maximizing market share and profits. The ability to forecast demand, in view of pricing and promotional alternatives, and to consider other factors which materially affect overall revenue and profitability is vital to the success of the bottom line, and the fundamental need to not only survive but to prosper and grow.

In particular, economic modeling is essential to businesses that face thin profit margins, such as general customer merchandise and other retail outlets. Many businesses are interested in economic modeling and forecasting, particularly when the model provides a high degree of accuracy or confidence. Such information is a powerful tool and highly valuable to the business.

Using the present system, a retailer collects T-LOG sales data for various products. Using the T-LOG data, the system generates a demand model for one or more products at one or more stores. The model is based upon the T-LOG data for that product and includes a plurality of parameters. The values of the parameters define the demand model and may be used for making predictions about the future sales activity for that product. For example, the model for each product can be used to predict future demand or sales of the product at that store in response to a proposed price, associated promotions or advertising, as well as impacts from holidays and local seasonal variations. Promotion and advertising increase customer awareness of the product.

An economic demand model analyzes historical retail T-LOG sales data to gain an understanding of retail demand as a function of retailer controlled factors such as price, promotion, time, customer, seasonal trends, holidays, and other attributes of the transaction. The demand model can be used to forecast future demand by customers as measured by unit sales. Unit sales are typically inversely related to price, i.e., the lower the price, the higher the sales. The quality of the demand model—and therefore the forecast quality—is directly affected by the quantity, composition, and accuracy of historical T-LOG sales data provided to the model.

The retailer makes business decisions based on forecasts. The retailer orders stock for replenishment purposes and select items for promotion or price discount. To support good decisions, it is important to quantify the quality of each forecast. The retailer can then review any actions to be taken based on the accuracy of the forecasts on a case-by-case basis.

Referring to FIG. 1, retailer 10 has certain product lines or services available to customers as part of its business plan 12. The terms products and services are interchangeable in the present commercial system. Retailer 10 may be a food store chain, general customer product retailer, drug store, discount warehouse, department store, specialty store, or service provider. Retailer 10 has the ability to set pricing, order inventory, run promotions, arrange its product displays, collect and maintain historical sales data, and adjust its strategic business plan. While the present discussion will center around retailer 10, it is understood that the system described herein is applicable to data analysis for other members in the chain of retail commerce, or other industries and businesses having similar goals, constraints, and needs.

Business plan 12 includes planning 12a, forecasting 12b, and optimization 12c steps and operations. Business plan 12 gives retailer 10 the ability to evaluate performance and trends, make strategic decisions, set pricing, order inventory, formulate and run promotions, hire employees, expand stores, add and remove product lines, organize product shelving and displays, select signage, and the like. Business plan 12 allows retailer 10 to analyze data, evaluate alternatives, run forecasts, and make decisions to control its operations. With input from the planning 12a, forecasting 12b, and optimization 12c steps and operations of business plan 12, retailer 10 undertakes various purchasing or replenishment operations 13. Retailer 10 can change business plan 12 as needed.

Retailer 10 routinely enters into sales transactions with customers 14. In fact, retailer 10 maintains and updates its business plan 12 to increase the number of transactions (and thus revenue and/or profit) between retailer 10 and customer 14. Customer 14 can be a specific individual, account, or business entity.

For each sales transaction entered into between retailer 10 and customer 14, information describing the transaction is stored in T-LOG 16. When a customer goes through the check-out at a grocery or any other retail store, each of the items to be purchased is scanned and data is collected and stored by a point-of-sale (POS) system, or other suitable data storage system, in T-LOG 16. The data includes the then current price, promotion, and merchandizing information associated with the product along with the units purchased, and the dollar sales. The date and time, and store and customer information corresponding to that purchase are also recorded.

T-LOG 16 contains one or more line items for each retail transaction, such as those shown in Table 1. Each line item includes information or attributes relating to the transaction, such as store number, product number, time of transaction, transaction number, quantity, current price, profit, promotion number, and customer or customer category or type number. The store number identifies a specific store; product number identifies a product; time of transaction includes date and time of day; quantity is the number of units of the product; current price (in US dollars) can be the regular price, reduced price, or higher price in some circumstances; profit is the difference between current price and cost of selling the item; promotion number identifies any promotion associated with the product, e.g., flyer, ad, sale price, coupon, rebate, end-cap, etc; customer identifies the customer by type, class, region, or individual, e.g., discount card holder, government sponsored or under-privileged, volume purchaser, corporate entity, preferred customer, or special member. T-LOG 16 is accurate, observable, and granular product information based on actual retail transactions within the store. T-LOG 16 represents the known and observable results from the customer buying decision or process. T-LOG 16 may contain thousands of transactions for retailer 10 per store per day, or millions of transactions per chain of stores per day.

TABLE 1

T-LOG Data

| STORE | PRODUCT | TIME | TRANS | QTY | PRICE | PROFIT | PROMOTION | CUSTOMER |
|-------|---------|------|-------|-----|-------|--------|-----------|----------|
| S1 | P1 | D1 | T1 | 1 | 1.50 | 0.20 | PROMO1 | C1 |
| S1 | P2 | D1 | T1 | 2 | 0.80 | 0.05 | PROMO2 | C1 |
| S1 | P3 | D1 | T1 | 3 | 3.00 | 0.40 | PROMO3 | C1 |
| S1 | P4 | D1 | T2 | 4 | 1.80 | 0.50 | 0 | C2 |
| S1 | P5 | D1 | T2 | 1 | 2.25 | 0.60 | 0 | C2 |
| S1 | P6 | D1 | T3 | 10 | 2.65 | 0.55 | PROMO4 | C3 |
| S1 | P1 | D2 | T1 | 5 | 1.50 | 0.20 | PROMO1 | C4 |
| S2 | P7 | D3 | T1 | 1 | 5.00 | 1.10 | PROMO5 | C5 |
| S2 | P1 | D3 | T2 | 2 | 1.50 | 0.20 | PROMO1 | C6 |
| S2 | P8 | D3 | T2 | 1 | 3.30 | 0.65 | 0 | C6 |

The first line item shows that on day/time D1, store S1 had transaction T1 in which customer C1 purchased one product P1 at $1.50. The next two line items also refer to transaction T1 and day/time D1, in which customer C1 also purchased two products P2 at $0.80 each and three products P3 at price $3.00 each. In transaction T2 on day/time D1, customer C2 has four products P4 at price $1.80 each and one product P5 at price $2.25. In transaction T3 on day/time D1, customer C3 has ten products P6 at $2.65 each, in his or her basket. In transaction T1 on day/time D2 (different day and time) in store S1, customer C4 purchased five products P1 at price $1.50 each. In store S2, transaction T1 with customer C5 on day/time D3 (different day and time) involved one product P7 at price $5.00. In store S2, transaction T2 with customer C6 on day/time D3 involved two products P1 at price $1.50 each and one product P8 at price $3.30.

Table 1 further shows that product P1 in transaction T1 had promotion PROMO1. PROMO1 may be any suitable product promotion such as a front-page featured item in a local advertising flyer. Product P2 in transaction T1 had promotion PROMO2 as an end-cap display in store S1. Product P3 in transaction T1 had promotion PROMO3 as a reduced sale price. Product P4 in transaction T2 on day/time D1 had no promotional offering. Likewise, product P5 in transaction T2 had no promotional offering. Product P6 in transaction T3 on day/time D1 had promotion PROMO4 as a volume discount for 10 or more items. Product P7 in transaction T1 on day/time D3 had promotion PROMO5 as a $0.50 rebate. Product P8 in transaction T2 had no promotional offering. A promotion may also be classified as a combination of promotions, e.g., flyer with sale price or end-cap with rebate.

Retailer 10 may also provide additional information to T-LOG 16 such as promotional calendar and events, holidays, seasonality, store set-up, shelf location, end-cap displays, flyers, and advertisements. The information associated with a flyer distribution, e.g., publication medium, run dates, distribution, product location within flyer, and advertised prices, is stored within T-LOG 16.

Supply data 17 is also collected and recorded from manufacturers and distributors. Supply data 17 includes inventory or quantity of products available at each location in the chain of commerce, i.e., manufacturer, distributor, and retailer. Supply data 17 includes product on the store shelf and replenishment product in the retailer's storage room.

With T-LOG 16 and supply data 17 collected, any suitable method or algorithm may be used to analyze the data and form demand model 18. Model 18 may use a combination of linear, nonlinear, deterministic, stochastic, static, or dynamic equations or models for analyzing T-LOG 16 or aggregated T-LOG 16 data and supply data 17 and making predictions about customer behavior to future transactions for a particular product at a particular store, or across entire product lines for all stores. Model 18 is defined by a plurality of parameters and may be used to generate unit sales forecasting, price optimization, promotion optimization, markdown/clearance optimization, assortment optimization, merchandize and assortment planning, seasonal and holiday variance, and replenishment optimization. Model 18 has a suitable output and reporting system that enables the output from model 18 to be retrieved and analyzed for updating business plan 12.

After collection and analysis of the T-LOG data and supply data, several demand models can be generated for one or more products sold by retailer 10 at one or more stores. The models are defined by several parameters that provide weighting for different elements of the model. For example, the parameters control how the model reflects changes in product advertising, pricing, promotional activities, or other aspects of the market environment for the product.

Figure 2:
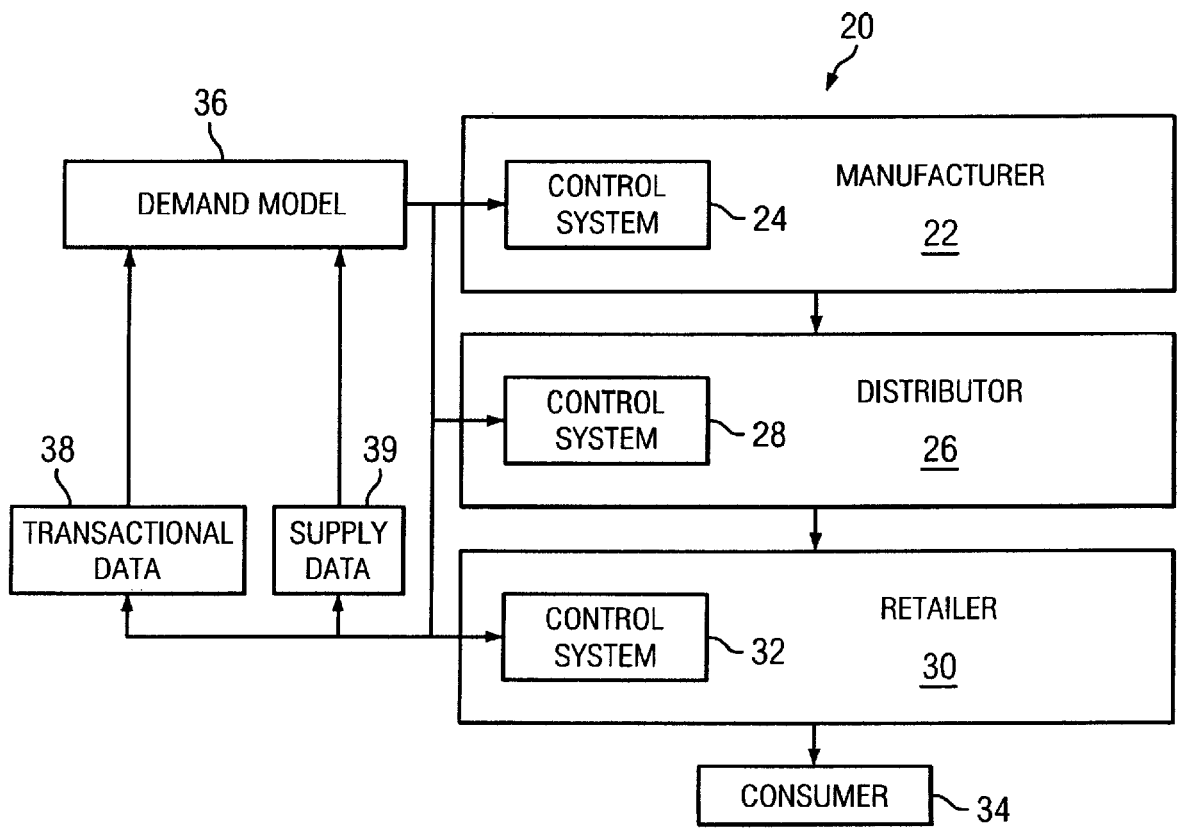
FIG. 2 is a block diagram of a commerce system controlled by members utilizing forecasts based on supply and demand.

In FIG. 2, a commerce system 20 is shown involving the movement of goods between members of the system. Manufacturer 22 produces goods in commerce system 20. Manufacturer 22 uses control system 24 to receive orders, control manufacturing and inventory, and schedule deliveries. Distributor 26 receives goods from manufacturer 22 for distribution within commerce system 20. Distributor 26 uses control system 28 to receive orders, control inventory, and schedule deliveries. Retailer 30 receives goods from distributor 26 for sale within commerce system 20. Retailer 30 uses control system 32 to place orders, control inventory, and schedule deliveries with distributor 26. Retailer 30 sells goods to customer 34.

Manufacturer 22, distributor 26, and retailer 30 utilize demand model 36 (equivalent to model 18), via respective control systems 24, 28, and 32, to control and optimize the ordering, manufacturing, distribution, sale of the goods, and otherwise execute respective business plan 12 within commerce system 20. Manufacturer 22, distributor 26, and retailer 30 provide historical transactional data 38 and supply data 39 to demand model 36 by electronic communication link, which in turn generates forecasts to predict the need for goods by each member and control its operations. In one embodiment, each member provides its own historical transactional data 38 and supply data 39 to demand model 36 to generate a forecast of demand specific to its business plan 12. Alternatively, all members can provide historical transactional data 38 and supply data 39 to demand model 36 to generate composite forecasts relevant to the overall flow of goods. For example, manufacturer 22 may consider a proposed price, rebate, promotion, seasonality, or other attribute for one or more goods that it produces. Demand model 36 generates the forecast of sales based on available supply and the proposed price, customer, rebate, promotion, time, seasonality, or other attribute of the goods. The forecast is communicated to control system 24 by electronic communication link, which in turn controls the manufacturing process and delivery schedule of manufacturer 22 to send goods to distributor 26 based on the predicted demand. Likewise, distributor 26 or retailer 30 may consider a proposed price, rebate, promotion, or other attributes for one or more goods that it sells. Demand model 36 generates the forecast of demand based on the available supply and proposed price, customer, rebate, promotion, time, seasonality, and/or other attribute of the goods. The forecast is communicated to control system 28 or control system 32 by electronic communication link, which in turn controls ordering, distribution, inventory, and delivery schedule for distributor 26 and retail 30 to meet the predicted demand for goods in accordance with the forecast.

Figure 3:
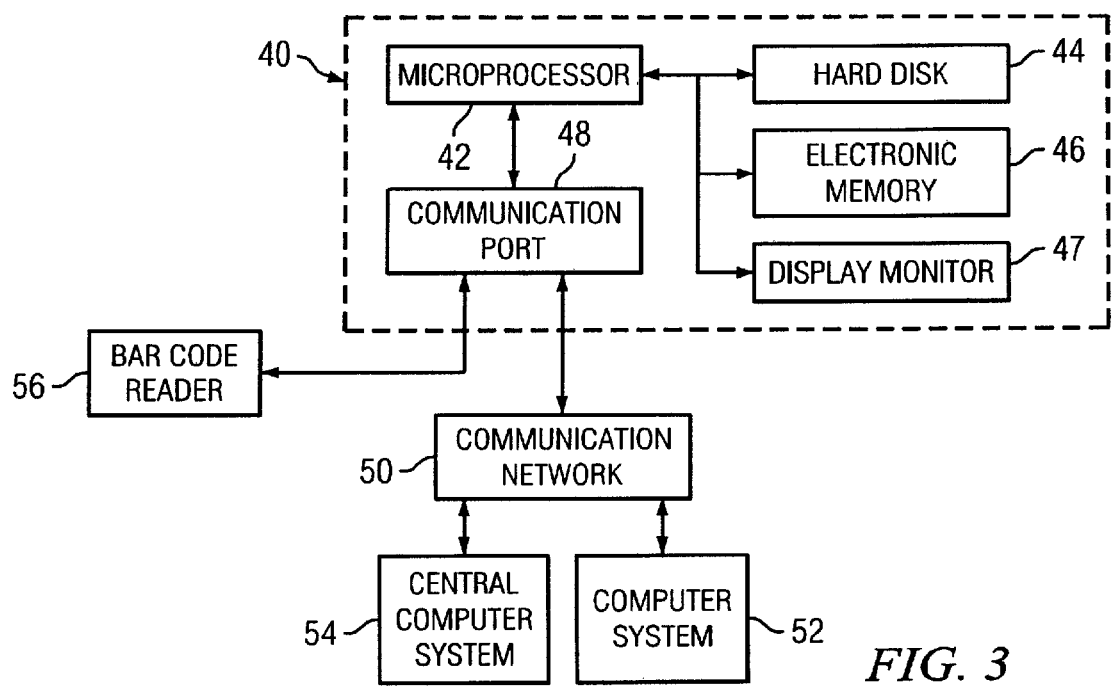
FIG. 3 is a computer system for executing the demand model and controlling the commerce system using forecasts based on supply and demand.

A general purpose computer 40 is shown in FIG. 3. Computer 40 includes central processing unit or microprocessor 42, mass storage device or hard disk 44, electronic memory 46, display monitor 47, and communication port 48. Communication port 48 is a high-speed communication link through communication network 50 to computer system 52 and central computer system 54, which includes a database storage system. In one embodiment, computer 40 provides execution for control system 32, computer system 52 provides execution for each of control systems 24 and 28, and central computer system 54 provides execution for demand model 36 from historical transactional data 38 and supply data 39. Demand model 36 can also be executed on each of control systems 24, 28, and 32.

Computer 40 runs application software for executing software instructions that generate forecasts through demand model 36 and control commerce system 20. The software is originally provided on computer readable media, such as compact disks (CDs), or downloaded from a vendor website, and installed on the desired computer.

In the case of retailer 30, each product includes a universal product code (UPC) or barcode label. The barcode is encoded with a unique identification number for the product. The product is scanned over barcode reader 56 at the store checkout counter to read the UPC identification number. Barcode reader 56 is connected to communication port 48 to transfer the UPC data to computer 40. Computer 40 may be part of a computer network which connects multiple barcode readers in many stores to a central computer system which stores historical transactional data 38 and supply data 39 in the database storage system.

From the UPC data, a product database on hard disk 44 retrieves the price for the product and any promotional initiatives. As each product from the customer's basket is scanned, computer 40 builds up a transaction in temporary file space on hard disk 44. Once the transaction is complete and customer 34 has paid, the transaction becomes a permanent T-LOG record in historical transactional data 38 in central computer system 54. Supply data 39 from manufacturer 22, distributor 26, and retailer 30 is also stored on the hard disk of central computer system 54. The historical T-LOG data and supply data is used to generate a demand model 36 which in turn is used to generate the forecast of demand. The forecast is used by respective control systems in manufacturer 22, distributor 26, and retailer 30 to control commerce system 20. Display monitor 47 displays the forecast for the user.

In one specific example, retailer 30 generates forecast using demand model 36 based on historical transactional data 38 and supply data 39, to predict demand associated with a proposed attribute of the transaction, e.g., a new and lower price for a particular product. Retailer 30 receives the forecast and executes or modifies its business plan 12 to act according to the prediction. If retailer 30 makes the business decision based on the forecast to proceed with the price reduction, control system 32 communicates with control systems 24 and 28 to coordinate manufacture and distribution of the product necessary to meet the projected demand by customer 34 in view of the price decrease. Manufacturer 22 increases its production of the product and distributor prepares to meet the orders from retailer 30. Demand model 36 is thus used in the control of commerce system 20.

Figure 4:
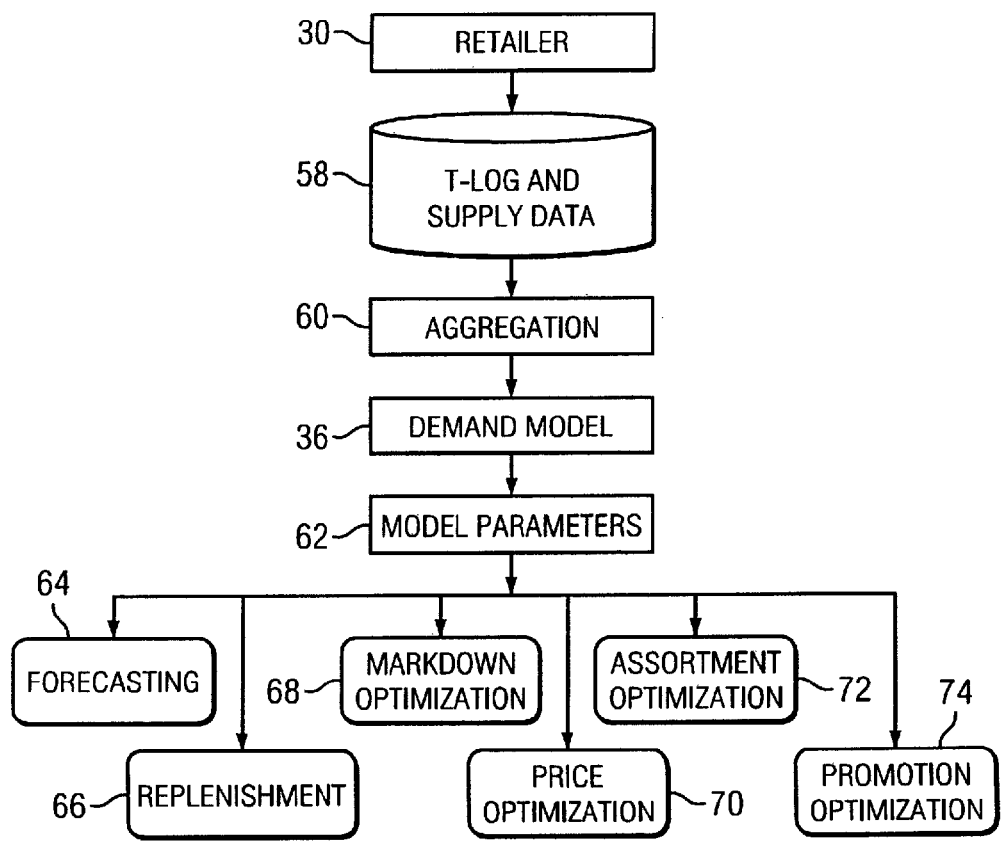
FIG. 4 illustrates another aspect of controlling the commerce system using forecasts based on supply and demand.

FIG. 4 illustrates another aspect of controlling commerce system 20. Retailer 30 generates T-LOG data. The T-LOG and supply data 58 can be aggregated in block 60. The T-LOG and supply data are transformed into a probability distribution of the forecast with parameters of customer store, product, time, seasonality, price, promotion, and merchandizing. Any suitable model may be used to analyze T-LOG and supply data 58 and generate forecasts based upon the data. The proper model is in part a function of the type of business. For example, retail grocery (same products purchased on regular basis) is a different model than retail clothing (different products purchased as fashion changes). The description of the following generic model does not limit the types of modeling applications.

Demand model 36 analyses T-LOG and supply data 58, and aggregations of the T-LOG and supply data and generates model parameters 62 to make useful predictions about future transactions. Model parameters 62 can be used for forecasting in block 64, replenishment in block 66, markdown optimization in block 68, price optimization in block 70, assortment optimization in block 72, and promotion optimization in block 74. In this manner, T-LOG and supply data 58 can be used to predict how much a customer would be willing to pay for a product, or which items to put on promotion, or to forecast the sales of a product at a particular store over a given time period.

Demand model 36 generates a forecast based on historical transactional data and supply data. FIG. 2 shows the supply chain for retailer 30. The supply data is available from manufacturer 22 and distributor 26, in terms of the quantity of each product that has been ordered and shipped. The supply data can be inventory or quantity of products readily available for purchase. For example, the overall inventory in a particular store could be divided among different parts of the store. A portion of the inventory could be assigned to the actual aisle where the product is located and a portion of the inventory is located on an aisle end display. The inventory available in the backroom storage of the store or in a readily accessible distribution center.

The supply data is particularly useful for short lifecycle products, e.g., fashion and electronics, which have lifecycle of a few months to a year. The supply data for fashion items must track size and color, as well as style, as each is a contributing factor to the purchase decision. Demand model 36 can also estimate demand for longer lifecycle products, especially when the product is a promoted product. The supply data can be characterized as the net quantity or availability of the product at a specific store, which includes inventory available in storage or inventory in distribution centers or warehouses.

Typically, short lifecycle products like clothing and electronics are not replenished at the store as often as longer lifecycle products like grocery or hardware. Retailer 30 typically orders large quantities of the short lifecycle products at the beginning of the lifecycle. Retailer 30 may not order the same product again or might do so at a much lower frequency than longer lifecycle products. The inventory available in the store affects the total sales to a large extent for such products.

An exemplary demand model is shown as function f in equation (1).

Unit Sales=f(customer store, product, time, seasonality, price, promotion, merchandizing)    (1)

In equation (1), the function f is a generic function of the variables customer, store, product, time, seasonality, price, promotion, and merchandizing. Among these variables, the variables customer, store, product, price, promotion, merchandizing, and time can be classified as "dimensions". Although, in alternative embodiments, other variables may be defined as dimensions of the transactional space. Of course, retailer 30 may choose to specify other variables as being in the dimensional space. In the present embodiment, the combination of a particular price, promotion, and merchandizing at a store, time, product, and customer dimension will be called an event.

The function f is represented as two separate elements for ease of modeling. The first element, $\tau$, is an expression of the number of customers who had access to a product at a particular store at a particular time and at a given price, promotion, and merchandizing. Accordingly, $\tau$ describes the number of customers that have access to a product at each point within the transactional space. The second element, g, is an expression of the sales per customer at that product, store, and time dimension at the given price, promotion, and merchandizing. The element g may include further terms which quantify sales, or quantify probabilities.

Accordingly, in the present embodiment, unit sales is modeled in equation (2) as:

$$\text{Unit Sales}_{c,s,t,pri,pro,m}^{P} = \tau_{c,s,p,t,pri,pro,m} \times g_{c,s,p,t}(pri, pro, m) \quad (2)$$

where: p denotes product
　c denotes customer
　t denotes time
　s denotes store
　pri denotes price
　pro denotes promotion
　m denotes merchandizing The sales history can be in the form of T-LOG 16 or aggregated transactional data. The promotion data contains details about promotional offers and durations, including dates of promotion, type of promotion, products in promotion, and prices in promotion. The product data contains details of the products and product hierarchy, including cost, price, and sales tax rate. The store data contains details of the stores and store hierarchy, including store type, store address, store size, date of opening, and dates when store was closed. The customer data contains customer loyalty data. The merchandizing data contains details of placement of products in store or on a website.

Note that many sales models can be expressed in the form shown in equation (2). The element $\tau$ contains terms which are calculated from T-LOG 16, while the element g contains terms which are estimated using a suitable model.

The element $\tau$ is either 0 or 1 depending upon whether the product is available at the given price, promotion, and merchandizing at the store, customer, and time dimensional space. The element g is a probability-based measure with several parameters that determine the total sales for a certain product at the given price, promotion, and merchandizing at the store, customer, and time dimensional space. When applying a suitable model, T-LOG 16 and historical values of $\tau$ are used to determine the parameters of g. The model, using the pre-calculated parameters of g and forecasted values of $\tau$, can then forecast future sales.

When analyzing aggregated T-LOG 16 data, however, $\tau$ need not be restricted to the values 1 and 0 as it was when analyzing the raw data in T-LOG 16. Instead it will be a measure of the number of customers who could have access to the event over that dimension group. In the present embodiment, when analyzing aggregated T-LOG 16 data, $\tau$ will be referred to as constrained traffic.

In this case, the element g measures the total sales resulting from the sale of the product at that event over the aggregated dimensional space. Note that in the present embodiment, $\tau$ is a number that can be determined from T-LOG 16 and g is a parametric function whose parameters will be estimated through modeling. When T-LOG 16 data is aggregated over the dimensions time, store, and customer from equation (2), the expression of unit sales becomes:

$$UnitSales_{tg,sg,cg}^{P} = \sum_{t \in tg, s \in sg, c \in cg} \tau_{c,s,p,t,pri,pro,m} \times g_{c,s,p,t}(pri, pro, m) \quad (3)$$

where: cg denotes customer groups
　sg denotes store groups
　tg denotes time groups
　g is a parametric function When summed over stores, times, or customers having similar parameters, g can be taken out of the summation. In the present embodiment, dimensions are aggregated so that the parameter values for each entry in a group are approximately equal. Accordingly, after aggregation, equation (2) can be expressed as:

$$UnitSales_{tg,sg,cg}^{P} = g_{cg,sg,tg}(pri, pro, m) \times \quad (4)$$
$$\sum_{t \in tg, s \in sg, c \in cg} \tau_{c,s,p,t,pri,pro,m}$$
$$= g_{cg,sg,tg}(pri, pro, m) \times \tau_{p,cg,sg,tg,pri,pro,m}$$

If the model is applied to each individual product, the product dimension is not aggregated. However, if the product dimension is aggregated, the model is applied for each product group instead of each individual product.

One important aspect of business plan 12 is the supply data, such as inventory or quantity of products readily available for purchase. Consider a case where retailer 30 offers a promotion for a product at a particular store. Table 2 shows the daily sales history for the product from the store during times of promotion and non-promotion.

TABLE 2

Product Sales by Day

| DAY | PRICE | PROMOTION | UNIT SALES |
|-----|-------|-----------|------------|
| 1 | $9.95 | No | 51 |
| 2 | $9.95 | No | 57 |
| 3 | $8.95 | Yes | 75 |
| 4 | $9.95 | No | 47 |
| 5 | $9.95 | No | 51 |
| 6 | $8.95 | Yes | 53 |
| 7 | $9.95 | No | 49 |
| 8 | $9.95 | No | 40 |
| 9 | $9.95 | No | 53 |

In Table 2, the product is considered high volume and perennial, selling many units per store on each day and requiring regular replenishment. On day 3, when the product is promoted at the promotion price of $8.95, there is a corresponding increase in sales from 57 units on day 2 to 75 units on day 3. After the promotion is removed, the product goes back to its normal sales pattern. However, when the price is again decreased to $8.95 on day 6, there is not a corresponding increase in observed unit sales. In addition, the unit sales on day 4 and day 8 is smaller than the average sales, even though the product goes back to its regular price of $9.95. The sales on day 4, day 6, and day 8 cannot be explained by data from Table 2, due to the lack of supply data.

Table 3 shows the sales data for the same period, now with the inventory of the product in the store. The product is replenished at the store every other day, i.e., day 2, day 4, and day 6, and day 8. The column inventory is the inventory in store at the beginning of the day, before replenishment during the day.

TABLE 3

Product Sales by Day with Inventory

| DAY | PRICE | PROMO-TION | SALES | INVENTORY | REPLENISH |
|---|---|---|---|---|---|
| 1 | $9.95 | No | 51 | 85 | |
| 2 | $9.95 | No | 57 | 34 | 105 |
| 3 | $8.95 | Yes | 75 | 82 | |
| 4 | $9.95 | No | 47 | 7 | 105 |
| 5 | $9.95 | No | 59 | 65 | |
| 6 | $8.95 | Yes | 53 | 6 | 105 |
| 7 | $9.95 | No | 49 | 58 | |
| 8 | $9.95 | No | 40 | 9 | 105 |
| 9 | $9.95 | No | 53 | 74 | |

On day 4, the product has an inventory of 7 units at the start of the day and replenishment does not occur until later in the day. The potential sales of the product in excess of the 7 available units are not realized before replenishment, i.e., the supply of the product was exhausted and potential sales did not occur. On day 6, the demand for the product increased with the decrease in price to $8.95. Again, with an inventory of 6 units, potential sales of the product in excess of the 6 available units are not realized before replenishment. A similar situation occurs on day 8. The low inventory on day 4, day 6, and day 8 distorts the sales from Table 2, which can be readily seen in Table 3. Thus, the inventory data provides additional useful information for modeling and forecasting.

Now consider the effect of supply data on modeling elasticity parameters. Table 4 shows the sales data of a product at a particular store for 7 weeks, each week running from Sunday to Saturday. Again, the product is perennial and requires weekly replenishment.

TABLE 4

Unit Sales of Product by Week

| WEEK | PRICE | PROMOTION | UNIT SALES |
|---|---|---|---|
| 1 | $22.95 | No | 51 |
| 2 | $22.95 | No | 56 |
| 3 | $22.95 | No | 48 |
| 4 | $22.95 | No | 57 |
| 5 | $19.95 | No | 58 |
| 6 | $22.95 | No | 48 |
| 7 | $22.95 | No | 53 |

As shown in Table 4, the product has a decrease in price from week 4 to week 5 due to a price decrease from $22.95 to $19.95. The price decrease should have a corresponding increase in unit sales. However, the unit sales during the promotion of week 5 are similar to other weeks. The demand model would infer this scenario as a lack of price sensitivity for product at the store.

However, once the supply data is considered, the product is shown to exhibit price elasticity. In Table 5, the product is replenished once a week, e.g., Monday morning. An increase in unit sales for the promotion did not occur because of low inventory, i.e., potential promotional sales are not realized. The low inventory at the beginning of the week, i.e., Sunday, prior to the replenishment on Monday causes the product to lose potential sales, in excess of the 6 available units. In addition, the product could have sold out again later in the week prior to replenishment on Monday of the following week. The actual sales during week 5 could have been higher if product were available during the entire week.

TABLE 5

Unit Sales of Product by Week with Inventory

| WEEK | PRICE | PROMO-TION | SALES | INVENTORY | REPLENISH |
|---|---|---|---|---|---|
| 1 | $22.95 | No | 51 | 10 | 52 |
| 2 | $22.95 | No | 56 | 11 | 52 |
| 3 | $22.95 | No | 48 | 7 | 52 |
| 4 | $22.95 | No | 57 | 11 | 52 |
| 5 | $19.95 | No | 58 | 6 | 52 |
| 6 | $22.95 | No | 48 | 0 | 52 |
| 7 | $22.95 | No | 53 | 4 | 52 |

Table 6 shows the daily inventory at the beginning of each day (prior to replenishment) for week 5 from Table 5. On Friday and Saturday, the store has 0 units of the product in stock for sale so any demand during these days is not realized. Potential sales on Monday prior to replenishment are also not realized. In Table 5, the weeks with the lowest inventory correspond to the lowest sales. Thus, the inventory data provides additional useful information for modeling and forecasting.

TABLE 6

Unit Sales of Product by Day in Week 5

| Week 5 | Sun | Mon | Tue | Wed | Thu | Fri | Sat |
|---|---|---|---|---|---|---|---|
| Inventory | 6 | 0 | 40 | 29 | 14 | 0 | 0 |

Next, the effect of supply data on promotional lift is considered. Table 7 shows the weekly sales of a product at a particular store for 10 weeks. The product has a regular price of $22.95. The price of the product is decreased in week 2, week 5, and week 6 to $21.95 without any promotion. A corresponding increase in unit sales can be observed. The product is offered in week 9 at a reduced price of $21.95 accompanied by a promotion of the reduced price in store flyers. However, the promotional event fails to see a substantial increase in unit sales. According to Table 7, the promotion lift associated with the store flyers for the product is small.

TABLE 7

Unit Sales of Product with Promotional Lift

| DAY | PRICE | PROMOTION | UNIT SALES |
|---|---|---|---|
| 1 | $22.95 | No | 47 |
| 2 | $21.95 | No | 55 |
| 3 | $22.95 | No | 43 |
| 4 | $22.95 | No | 42 |

TABLE 7-continued

Unit Sales of Product with Promotional Lift

| DAY | PRICE | PROMOTION | UNIT SALES |
|---|---|---|---|
| 5 | $21.95 | No | 57 |
| 6 | $21.95 | No | 52 |
| 7 | $22.95 | No | 42 |
| 8 | $22.95 | No | 48 |
| 9 | $21.95 | Yes | 55 |
| 10 | $22.95 | No | 43 |

Table 8 shows the same product with promotional lift and supply data. The product is replenished with 92 units in the morning of day 2, day 4, day 6, and day 8. The inventory is depleted on day 9, i.e., all 55 units sold out. The potential sales of the product in excess of the 55 available units are not realized. With additional inventory, the product could potentially have sold more units on day 9 in response to the promotional lift. Thus, the inventory data provides additional useful information for modeling and forecasting.

TABLE 8

Unit Sales with Promotional Lift and Inventory

| DAY | PRICE | PROMO-TION | UNIT SALES | INVENTORY | REPLENISH |
|---|---|---|---|---|---|
| 1 | $22.95 | No | 47 | 60 | |
| 2 | $21.95 | No | 55 | 13 | 92 |
| 3 | $22.95 | No | 43 | 50 | |
| 4 | $22.95 | No | 42 | 7 | 92 |
| 5 | $21.95 | No | 57 | 57 | |
| 6 | $21.95 | No | 52 | 0 | 92 |
| 7 | $22.95 | No | 42 | 50 | |
| 8 | $22.95 | No | 45 | 8 | 92 |
| 9 | $21.95 | Yes | 55 | 55 | |
| 10 | $22.95 | No | 43 | 0 | 92 |

To improve the optimization and forecasting, demand model 36 is expressed in equation (5) in terms of function h of supply and demand, where $US_t$ is the unit sales at time t, $S_t$ is the supply at time t, and $D_t$ is the demand at time t.

$$US_t = h(S_t, D_t) \quad (5)$$

$D_t$ can be expressed as a function of product, store, price, promotion, customer, and merchandizing apart from the time t in equation (1), and more specifically $D_t$ is given in equations (2)-(4). $S_t$ is expressed as a function k of product, store, inventory, and merchandising in equations (6) and (7). Equation (8) shows an exemplary function of demand model 36 incorporating demand and supply, expressed in terms of $D_t$ and $S_t$, into the forecast.

$$S_t = k(\text{inventory, product, store, merchandising}) \quad (6)$$

$$S_t = \sum_{p \in products, s \in stores} I_{t,p,s} \quad (7)$$

$$US_t = \frac{D_t S_t}{D_t + S_t} \quad (8)$$

In executing equation (8), demand model 36 is typically given boundary conditions for efficient operation of the model. The total unit sales in each time period for a product at a store have to be smaller than the inventory in that store for that product at the beginning of the time period, i.e., $US_t \leq S_t$. As the inventory tends to infinity, the function g should ensure that the model predicts sales corresponding to the demand function, i.e., $S_t \to \infty \Rightarrow US_t \to D_t$. As the demand goes to infinity, the function g should ensure that the model predicts sales tending towards the inventory, i.e., $D_t \to \infty \Rightarrow US_t \to S_t$. As the inventory of a product at a store goes to 0, the corresponding unit sales should also go to zero, i.e., $S_t \to 0 \Rightarrow US_t \to 0$. As the demand goes to 0, the function g should ensure that the unit sales also go to 0, i.e., $D_t \to 0 \Rightarrow US_t \to 0$.

Figure 5:
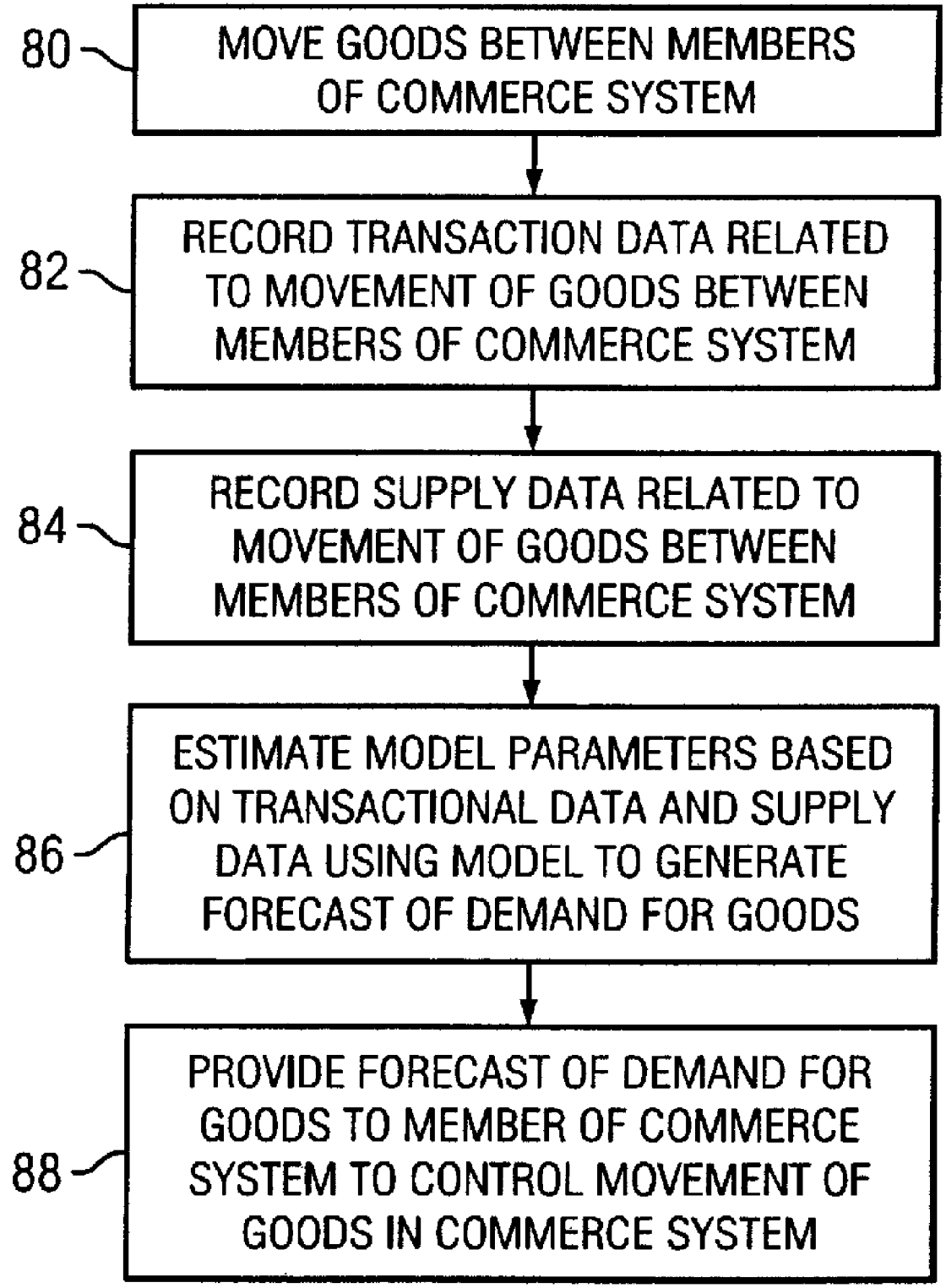
FIG. 5 illustrates a method for forecasting based on supply and demand.

FIG. 5 illustrates a process for controlling commercial transactions using a model to generate a forecast based on transactional data and supply data. In step 80, goods move between members of a commerce system. In step 82, transactional data related to movement of goods between the members of the commerce system is recorded. The transactional data includes customer store, product, time, price, promotion, and merchandizing. In step 84, supply data related to movement of goods between the members of the commerce system is recorded. The supply data includes inventory, product, store, and merchandising. In step 86, model parameters are estimated based on the transactional data and supply data using a model to generate a forecast of demand for the goods. In step 88, the forecast of demand for the goods is provided to a member of the commerce system to control the movement of goods in the commerce system. The forecast of demand accounts for an out-of-stock condition, price promotion, and promotional lift of a product.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer-implemented method for transforming transactional data and supply data into a forecast of demand for controlling a commerce system, the method comprising:
    recording transactional data related to movement of goods between members of a commerce system, the transactional data including customer store, product, time, price, promotion, and merchandizing;
    recording supply data related to movement of goods between the members of the commerce system, the supply data including inventory, product, store, and merchandising;
    estimating, by a processor, model parameters based on the transactional data and supply data using a model to generate a forecast of demand for the goods according to expression:

$$US_t = \frac{D_t S_t}{D_t + S_t}; \text{ and}$$

providing the forecast of demand for the goods to a member of the commerce system to control the movement of goods in the commerce system.

2. The computer-implemented method of claim 1, further including accounting, by the processor, for an out-of-stock condition of a product in the forecast of demand.

3. The computer-implemented method of claim 1, further including accounting, by the processor, for a price promotion of a product in the forecast of demand.

4. The computer-implemented method of claim 1, further including accounting, by the processor, for a promotional lift of a product in the forecast of demand.

5. The computer-implemented method of claim 1, wherein unit sales in a time period for a product is less than the inventory in that store for the product at a beginning of the time period.

6. A computer-implemented method for controlling commercial transactions using a forecast of demand based on transactional data and supply data, comprising:
  recording transactional data related to movement of goods between members of a commerce system;
  recording supply data related to movement of goods between the members of the commerce system;
  estimating, by a processor, model parameters based on the transactional data and supply data using a model to generate a forecast of demand for the goods, according to expression:

$$US_t = \frac{D_t S_t}{D_t + S_t}; \text{ and}$$

providing the forecast of demand for the goods to a member of the commerce system to control the movement of goods in the commerce system.

7. The computer-implemented method of claim 6, further including accounting, by the processor, for an out-of-stock condition of a product in the forecast of demand.

8. The computer-implemented method of claim 6, further including accounting, by the processor, for a price promotion of a product in the forecast of demand.

9. The computer-implemented method of claim 6, further including accounting, by the processor, for a promotional lift of a product in the forecast of demand.

10. The computer-implemented method of claim 6, wherein unit sales in a time period for a product is less than the inventory in that store for the product at a beginning of the time period.

11. The computer-implemented method of claim 6, wherein the supply data includes inventory or quantity of products readily available for purchase.

12. A non-transitory medium having computer readable program code stored thereon, the program code to implement a method for controlling commercial transactions using a forecast of demand based on transactional data and supply data, the medium comprising:
  program code to move goods between members of a commerce system;
  program code to record transactional data related to movement of goods between the members of the commerce system;
  program code to record supply data related to movement of goods between the members of the commerce system;
  program code to estimate model parameters based on the transactional data and supply data using a model to generate a forecast of demand for the goods, according to expression:

$$US_t = \frac{D_t S_t}{D_t + S_t}; \text{ and}$$

program code to provide the forecast of demand for the goods to a member of the commerce system to control the movement of goods in the commerce system.

13. The medium of claim 12, wherein the supply data includes inventory or quantity of products readily available for purchase.

14. The medium of claim 12, wherein unit sales in a time period for a product is less than the inventory in that store for the product at a beginning of the time period.

15. The medium of claim 12, further including program code to account for an out-of-stock condition of a product in the forecast of demand.

16. The medium of claim 12, further including program code to account for a price promotion of a product in the forecast of demand.

17. The medium of claim 12, further including program code to account for a promotional lift of a product in the forecast of demand.

18. A system for controlling commercial transactions using a forecast of demand based on transactional data and supply data, comprising:
  a commerce system having a plurality of members each having a control system for controlling movement of goods between the members;
  a database in electronic communication with the commerce system for recording transactional data and supply data related to movement of goods between the members of the commerce system; and
  a computer in electronic communication with the commerce system for estimating model parameters based on the transactional data and supply data using a model to generate a forecast of demand for the goods,
  wherein the model parameters are estimated based on the transactional data and supply data according to expression:

$$US_t = \frac{D_t S_t}{D_t + S_t}; \text{ and}$$

wherein the forecast of demand for the goods is provided to a member of the commerce system to control the movement of goods in the commerce system.

19. The system of claim 18, wherein the supply data includes inventory or quantity of products readily available for purchase.

20. The system of claim 18, wherein unit sales in a time period for a product is less than the inventory in that store for the product at a beginning of the time period.

21. The system of claim 18, wherein the forecast of demand accounts for an out-of-stock condition, price promotion, or promotional lift of a product.

* * * * *